(12) United States Patent
Bhargava et al.

(10) Patent No.: US 8,648,501 B2
(45) Date of Patent: Feb. 11, 2014

(54) SYSTEMS AND METHODS FOR PROVIDING PROTECTION CIRCUITRY TO SELECTIVELY HANDLE MULTIPLE CABLE-TYPES THROUGH THE SAME PORT

(71) Applicant: Apple Inc., Cupertino, CA (US)

(72) Inventors: Rishabh Bhargava, San Jose, CA (US); Doug M. Farrar, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/797,850

(22) Filed: Mar. 12, 2013

(65) Prior Publication Data

US 2013/0200726 A1    Aug. 8, 2013

Related U.S. Application Data

(63) Continuation of application No. 12/477,547, filed on Jun. 3, 2009, now abandoned.

(60) Provisional application No. 61/158,565, filed on Mar. 9, 2009.

(51) Int. Cl.
*H01H 35/00* (2006.01)
*H01H 67/00* (2006.01)

(52) U.S. Cl.
USPC .......................................... 307/116; 307/125

(58) Field of Classification Search
USPC .................................................. 307/116, 125
See application file for complete search history.

(56) References Cited

U.S. PATENT DOCUMENTS

| 5,774,741 A | 6/1998 | Choi |
| 5,794,163 A | 8/1998 | Paterson et al. |
| 5,832,419 A | 11/1998 | Voshell et al. |

(Continued)

FOREIGN PATENT DOCUMENTS

| CN | 1354958 A | 6/2002 |
| CN | 1640083 A | 7/2005 |

(Continued)

OTHER PUBLICATIONS

Chinese Office Action mailed on Jun. 3, 2013 for CN Patent Application No. 200980157852.9, with English Translation, 16 pages.

(Continued)

*Primary Examiner* — Adi Amrany

(74) *Attorney, Agent, or Firm* — Kilpatrick Townsend & Stockton LLP

(57) ABSTRACT

This is generally directed to providing protection circuitry to selectively handle power-providing cables and headset cables that can couple to the same port of an electronic device. In some embodiments, the device can include a Headset Rx chip to communicate with the headset cable and a Power Rx chip to communicate with the power-providing cable. As the Headset Rx chip and the Power Rx chip can be coupled to the same contact of the device's port, these chips may prevent one another from operating correctly or may damage one another. Accordingly, in some embodiments, it can be determined whether a headset cable or a power-providing cable is coupled to the device. When a headset cable is coupled to the device, the protection circuitry can disconnect the Power Rx chip. Similarly, when a power-providing cable is coupled to the device, the protection circuitry can disconnect the Headset Rx chip.

16 Claims, 9 Drawing Sheets

(56) References Cited

U.S. PATENT DOCUMENTS

| | | | |
|---|---|---|---|
| 5,836,785 A | 11/1998 | Lee | |
| 6,038,457 A * | 3/2000 | Barkat | 455/556.1 |
| 6,144,399 A | 11/2000 | Manchester et al. | |
| 6,151,652 A | 11/2000 | Kondo et al. | |
| 6,452,402 B1 | 9/2002 | Kerai | |
| 6,580,460 B1 | 6/2003 | Takahashi et al. | |
| 7,305,253 B2 * | 12/2007 | Snyder et al. | 455/557 |
| 7,550,877 B2 | 6/2009 | Masui et al. | |
| 7,589,536 B2 | 9/2009 | Terlizzi et al. | |
| 7,627,128 B2 | 12/2009 | Sander et al. | |
| 7,734,841 B2 * | 6/2010 | Townsend | 710/16 |
| 7,768,579 B2 | 8/2010 | Huang et al. | |
| 7,811,124 B2 | 10/2010 | Kim et al. | |
| 7,911,530 B2 | 3/2011 | Sawachi | |
| 7,949,802 B2 * | 5/2011 | Gallant et al. | 710/36 |
| 8,171,322 B2 * | 5/2012 | Fiennes et al. | 713/323 |
| 8,332,664 B2 * | 12/2012 | Farrar et al. | 713/300 |
| 2005/0201568 A1 | 9/2005 | Goyal | |
| 2005/0266800 A1 | 12/2005 | Mathews | |
| 2006/0166539 A1 | 7/2006 | Corey et al. | |
| 2007/0281756 A1 | 12/2007 | Hyatt et al. | |
| 2008/0140887 A1 | 6/2008 | Gallant et al. | |
| 2008/0164994 A1 | 7/2008 | Johnson et al. | |
| 2008/0167828 A1 | 7/2008 | Terlizzi et al. | |
| 2008/0309313 A1 | 12/2008 | Farrar et al. | |
| 2009/0051666 A1 | 2/2009 | Choi et al. | |
| 2010/0225176 A1 | 9/2010 | Bhargava et al. | |

FOREIGN PATENT DOCUMENTS

| | | |
|---|---|---|
| EP | 1 467 285 A1 | 10/2004 |
| GB | 2466328 A | 6/2010 |
| TW | 200843250 A | 11/2008 |
| WO | 00/42797 A1 | 7/2000 |
| WO | 03/077504 A2 | 9/2003 |
| WO | 2006/073702 A1 | 7/2006 |
| WO | 2008/114927 A1 | 9/2008 |

OTHER PUBLICATIONS

Combined Search and Examination Report mailed on Jun. 26, 2013 for for GB Patent Application No. GB1310740.4, 4 pages.

Examination Report mailed on Sep. 17, 2012 for GB Patent Application No. GB1115001.8, 2 pages.

Final Office Action mailed on Oct. 12, 2012 for U.S. Appl. No. 12/477,547, 11 pages.

Final Office Action mailed on Oct. 17, 2011 for U.S. Appl. No. 12/477,547, 11 pages.

International Search Report and Written Opinion mailed on Apr. 9, 2010 for PCT Patent Application No. PCT/US2009/069043, 10 pages.

Non-Final Office Action mailed on Apr. 17, 2012 for U.S. Appl. No. 12/477,547, 20 pages.

Non-Final Office Action mailed on Apr. 28, 2011 for U.S. Appl. No. 12/477,547, 12 pages.

* cited by examiner

SYSTEMS AND METHODS FOR PROVIDING PROTECTION CIRCUITRY TO SELECTIVELY HANDLE MULTIPLE CABLE-TYPES THROUGH THE SAME PORT

CROSS-REFERENCES TO RELATED APPLICATIONS

This application is a continuation of U.S. patent application Ser. No. 12/477,547, filed Jun. 3, 2009, which is a non-provisional of 61/158,565 filed Mar. 9, 2009, which are incorporated by reference.

BACKGROUND

This relates to systems and methods for providing protection circuitry to selectively handle multiple cable-types through the same port of an electronic device. In particular, this relates to systems and methods for providing protection circuitry to selectively handle power-providing cables and non-power providing cables through the same port of an electronic device.

As technology becomes more sophisticated, electronic devices tend to get smaller. For example, electronic devices such as laptops, digital media players (e.g., an iPod™ made available by Apple Inc. of Cupertino, Calif.), cellular telephones, personal data assistants ("PDAs"), handheld gaming devices, and personal e-mail devices (e.g., a Blackberry™ made available by Research in Motion of Waterloo, Ontario) are getting smaller in size. This is often the case even though the internal circuitry and capabilities of these smaller electronic devices may be more advanced than their larger and older counterparts. As electronic devices become smaller in size, it can become necessary to conserve space on the electronic device. As one example of a way to conserve space, the number of ports available for coupling the electronic device to various cables can be reduced.

SUMMARY

Systems and methods for providing protection circuitry to selectively handle multiple cable-types through the same port of an electronic device are provided. In particular, systems and methods for providing protection circuitry to selectively handle power-providing cables and non-power providing cables that can couple to the same port of an electronic device are provided.

In some embodiments, a power-providing cable (e.g., a USB cable, or any other suitable power-providing cable) and a non-power providing cable (e.g., headphones, microphones, a user control interface, such as a remote controller that can include at least one user input, speakers, headset, or any other suitable non-power providing cable) can couple to the same port on an electronic device. The power-providing cable can include a Power Cable Transmit Chip ("Power Tx") that can communicate with a Power Cable Receive Chip ("Power Rx") of the electronic device. Similarly, the non-power providing cable can include a Headset Cable Transmit Chip ("Headset Tx") that can communicate with a Headset Cable Receive Chip ("Headset Rx") of the electronic device. In some embodiments, the Power Rx can communicate with the Power Tx to authenticate the power-providing cable and the Headset Rx can communicate with the Headset Tx to authenticate the non-power providing cable.

In some embodiments, the same contact of the port can be used to receive a power signal ("PWR") when a power-providing cable is coupled to the electronic device and to receive user input signals ("INPUT") when a non-power providing cable is coupled to the electronic device. In some embodiments, the Power Rx and the Headset Rx of the electronic device can also be coupled to this contact. However, in some cases the Power Rx can prevent the Headset Rx from operating correctly or can be damaging to the Headset Rx. For example, if a non-power providing cable is coupled to the electronic device, the input capacitance of the Power Rx can prevent the Headset Rx from properly authenticating the Headset Tx, or leakage current from the Power Rx can damage user input signals received from the non-power providing cable. As another example, if a power-providing cable is coupled to the electronic device, the PWR signal can cause electrical shorts or damage the Headset Rx if the Headset Rx does not have proper protection to handle a power signal.

Accordingly, in some embodiments, it can be determined whether a power-providing cable or a non-power providing cable is coupled to the electronic device. If a non-power providing cable is coupled to the electronic device, the Power Rx chip can be disconnected to prevent it from possibly harming operation of the Headset Rx chip. Similarly, if a power-providing cable is coupled to the electronic device, the Headset Rx chip can be disconnected to prevent it from possibly being harmed by the PWR signal.

In some embodiments, the type of cable that is coupled to the electronic device can be determined by attempting to authenticate a particular type of cable. For example, the Power Rx chip can be disconnected and the Headset Rx chip can attempt to authenticate a Headset Tx chip. If a Headset Tx chip is successfully authenticated, the current settings can be maintained and the Power Rx chip can remain disconnected. If a Headset Tx chip is not successfully authenticated, the Power Rx chip can be reconnected and the Headset Rx chip can be disconnected. The Power Rx chip can then attempt to authenticate a Power Tx chip. If a Power Tx chip is authenticated, the current settings can be maintained and the Headset Rx chip can remain disconnected. If a Power Tx chip is not authenticated, the system can alternate between attempting to authenticate a Headset Tx chip and a Power Tx chip until one of them is successfully authenticated.

In some embodiments, the type of cable that is coupled to the electronic device can be determined by identifying whether a PWR signal is received. If a PWR signal is received, this can indicate that a power-providing cable is coupled to the electronic device. Accordingly, the Headset Rx chip can be disconnected. If a PWR signal is not received, however, this can indicate that a non-power providing cable is coupled to the electronic device. In this scenario, the Power Rx chip can be disconnected.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DESCRIPTION OF ILLUSTRATIVE EMBODIMENTS

Electronic devices can couple to various types of cables through various types of ports. For example, electronic devices can couple to data and power-providing cables such as universal serial bus ("USB") cables or any other suitable power-providing cables. As another example, electronic devices can couple to non-power providing cables such as headphones, microphones, user control interfaces (e.g., remote controllers that can include at least one user input), speakers, or any other suitable non-power providing cables. The cables can couple to the electronic device through any suitable port such as, for example, a multi-contact connector port (e.g., a 30-pin connector port), a Firewire port, a USB port (e.g., a Type A port, a Type B port, Mini-A port, or a Mini-B port), a PS/2 port, an audio jack (e.g., a 3.5 millimeter or 2.5 millimeter jack), an Ethernet port, a telephone modem port, or any other suitable port.

Figure 1:
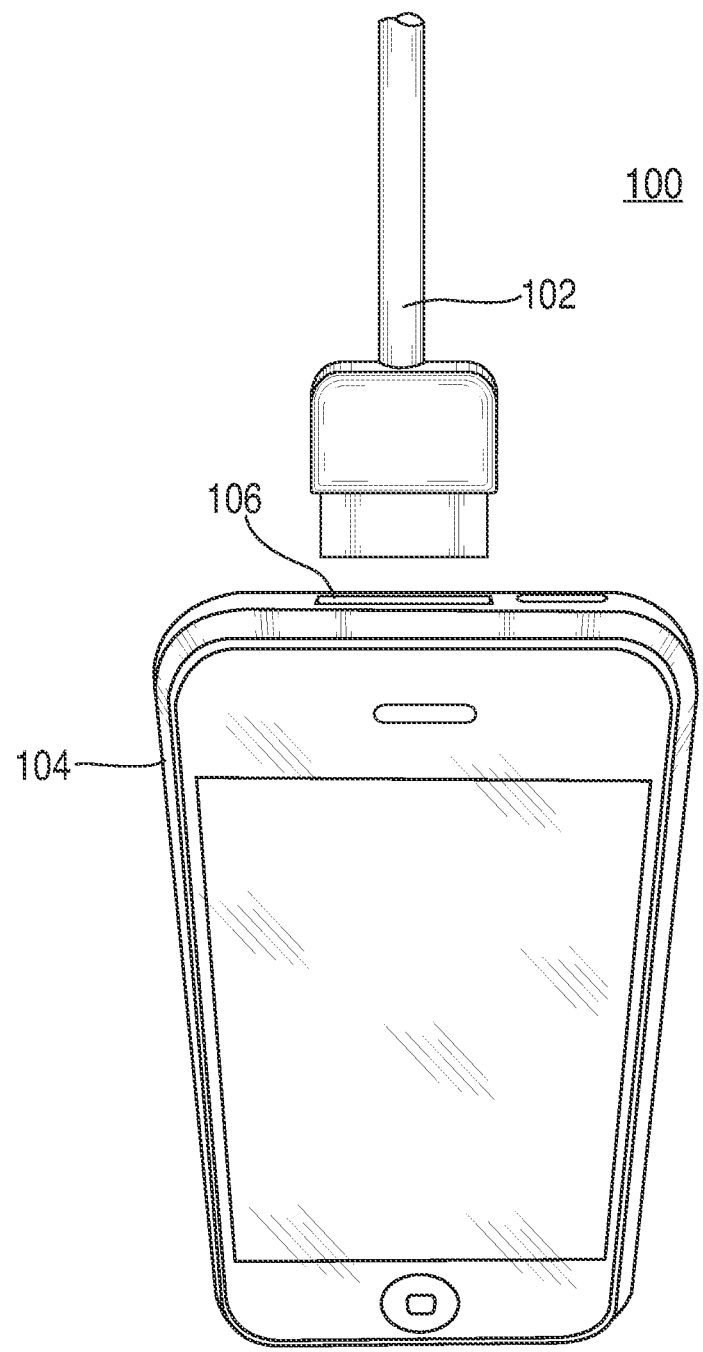
FIGS. 1 and 2 show illustrative systems including power-providing cables in accordance with some embodiments of the invention.

FIG. 1 shows an illustrative system 100 that can include power-providing cable 102. Power-providing cable 102 can couple to electronic device 104 through, for example, port 106 of electronic device 104. In some embodiments, in addition to providing power, power-providing cable 102 can additionally communicate data to electronic device 104. For example, in some embodiments, power-providing cable 102 can include a USB cable that is capable of providing both data and power to electronic device 104. Electronic device 104 can include any suitable device that can couple to power-providing cable 102 such as, for example, a laptop computer, a desktop computer, a digital media player (e.g., an iPod™), a cellular telephone, a PDA, a handheld gaming device, a personal e-mail device (e.g., a Blackberry™), or any other suitable electronic device. Port 106 can include any port suitable to receive power-providing cable 102 such as, for example a USB Type-A port, a USB Type-B port, a USB Mini-A port, a USB Mini-B port, or any other suitable port.

In some embodiments, power-providing cable 102 can communicate four signals as inputs, outputs, or both to electronic device 104. For example, power-providing cable 102 can communicate signals such as ground (e.g., GND), power (e.g., PWR), and two data lines (e.g., D+ and D−). Power-providing cable 102 may, for example, include four contacts, where each of the four signals can be provided to electronic device 104 through a separate contact.

Figure 2:
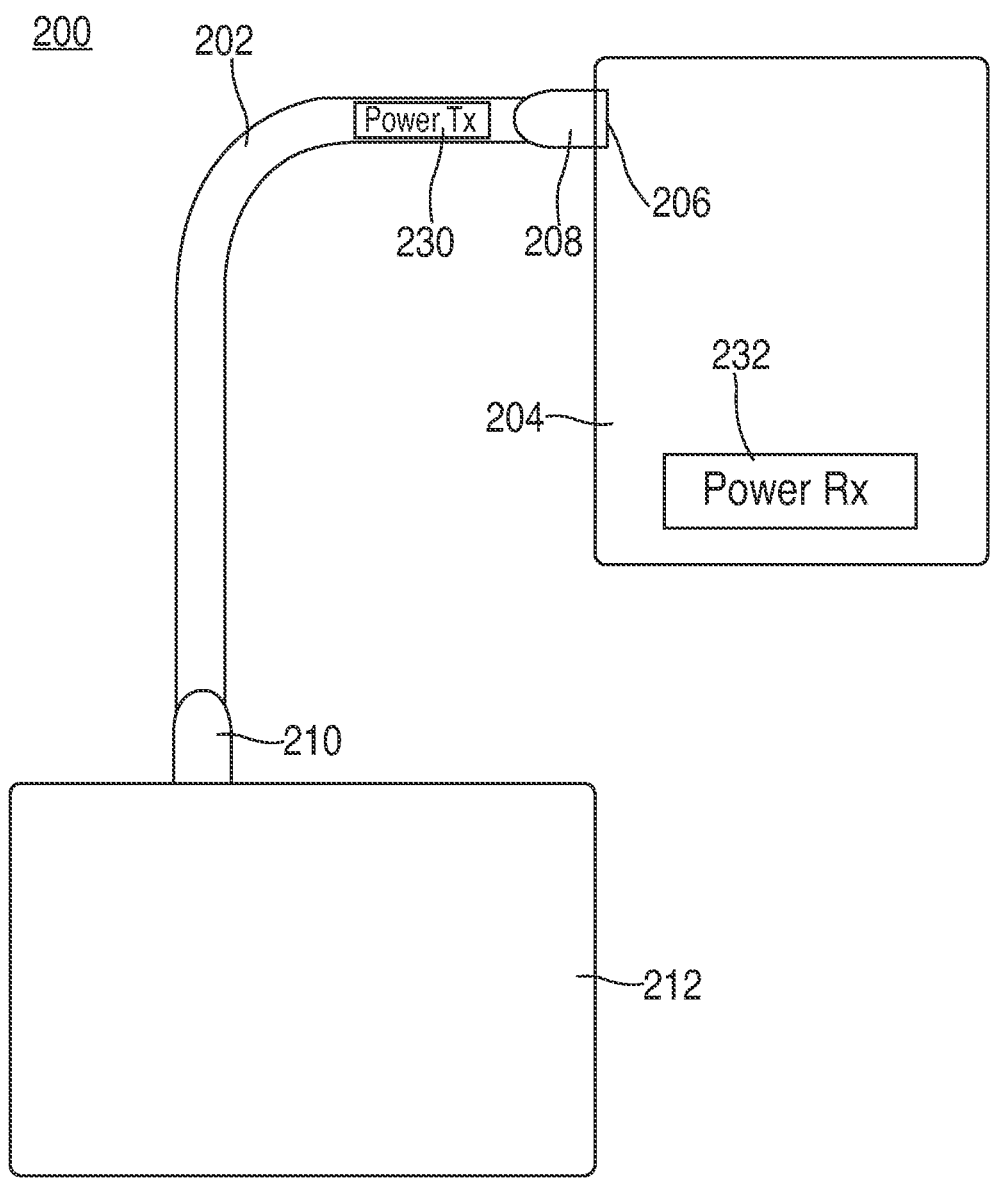

In some embodiments, the power signals, the data signals, or both (e.g., the PWR signal, D+ and D− signals, or both), can be supplied to electronic device 104 by a friendly device that is coupled to a plug on the other end of power-providing cable 102. For example, FIG. 2 shows system 200 that can include power-providing cable 202. Plug 208 of power-providing cable 202 can be coupled to electronic device 204 at port 206 and plug 210 of power-providing cable 202 can be coupled to friendly device 212. Although power-providing cable 202 is illustrated in FIG. 2 as having two plugs (e.g., plug 208 and plug 210), one skilled in the art can appreciate that in some embodiments power-providing cable 202 may split, and thus may include three or more plugs. Friendly device 212 can be any suitable device for supplying power, data, or both to electronic device 204 such as, for example, a desktop computer, a laptop computer, or any other suitable friendly device. In some embodiments, rather than coupling plug 210 to friendly device 212, power can be provided to electronic device 204 by coupling plug 210 to a power supply such as, for example, a wall socket or a battery.

In some embodiments, power-providing cable 202 and electronic device 204 can each include one or more integrated circuits to allow them to communicate with one other. For example, power-providing cable 202 can include power-providing cable transmit chip ("Power Tx") 230 and electronic device 204 can include power-providing cable receive chip ("Power Rx") 232. Although Power Tx 230 is illustrated as being located in the middle of power-providing cable 202, one skilled in the art can appreciate that Power Tx 230 may alternatively be located at either end (e.g., within plug 208 or plug 210) or anywhere along the length of power-providing cable 202.

In some embodiments, Power Tx 230 and Power Rx 232 can communicate in order to identify or authenticate one another. For example, Power Rx 232 can communicate with Power Tx 230 to determine the characteristics or identity of power-providing cable 202, of a friendly device that is coupled to power-providing cable 202 (e.g., friendly device 212), of a power supply that is coupled to power-providing cable 202, or any combination of the above. For example, Power Rx 232 can determine the characteristics of the power being supplied, the characteristics of the data being supplied, the operating environment of the friendly device, the type of friendly device, or any other suitable characteristics. Power Tx 230 can fail to authenticate if, for example, it is determined that the cable, friendly device, or power supply is not appropriate for use with electronic device 204. For example, the friendly device or power supply may be attempting to provide too much power, an improperly regulated power supply signal, or an otherwise potentially harmful power signal to electronic device 204. As another example, the friendly device may be identified as a device that is not approved for use with electronic device 204 (e.g., the friendly device may be manufactured by a non-approved third party vendor). In this case, when Power Tx 230 fails to authenticate, Power Rx 232 can prevent power, data, or both from being transmitted and/or received by electronic device 204 through power-providing cable 202.

If Power Tx 230 does successfully authenticate, Power Rx 232 may, for example, allow power, data, or both to be transmitted and/or received from power-providing cable 202. As another example, Power Rx 232 may instruct Power Tx 230 to regulate the power by providing it in a certain manner (e.g., by providing the power at a certain intensity, voltage, or current).

In some embodiments, Power Tx 230 and Power Rx 232 can authenticate one another through the PWR signal. For example, Power Tx 230 may provide a series of pulses through the PWR signal to Power Rx 232. If an appropriate series of pulses are received by Power Rx 232 (e.g., if a PWR signal of the appropriate frequency, amplitude, portraying the appropriate current spikes, or any combination of the above is received), Power Rx 232 may then authenticate Power Tx 230.

Figure 3:
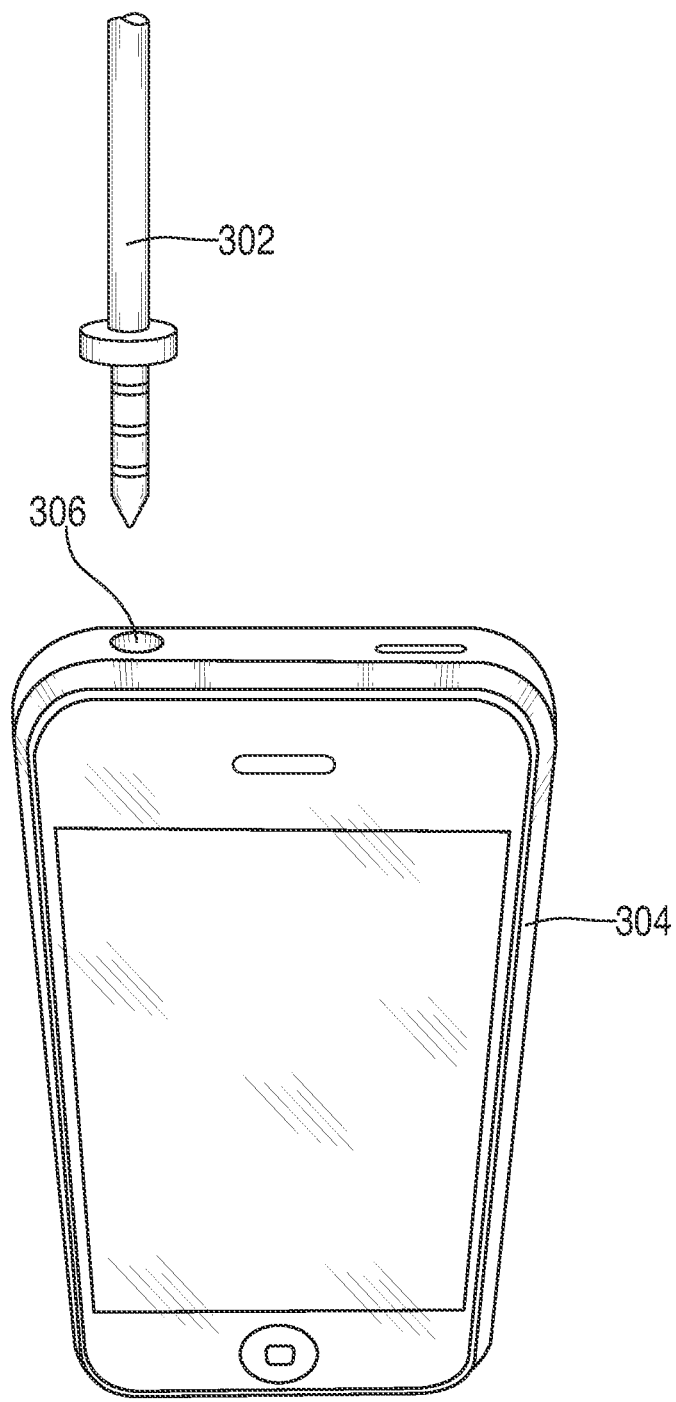
FIGS. 3 and 4 show illustrative systems including non-power providing cables in accordance with some embodiments of invention.

As mentioned above, in some embodiments an electronic device can be coupled to a non-power providing cable such as, for example, a cable associated with headphones, a microphone, a user control interface (e.g., a remote controller that can include at least one user input), speakers, a headset, or any other suitable non-power providing cable. For example, FIG. 3 shows non-power providing cable or headset cable 302 that can couple to electronic device 304 through port 306 of electronic device 304. As used herein, the terms "headset" and "headset cable" are used throughout the disclosure for simplicity and clarity, but one skilled in the art can appreciate that any suitable non-power providing cable may alternatively be used without departing from the scope of the invention.

Similar to electronic device 104 of FIG. 1, electronic device 304 can include any suitable electronic device that can couple to headset cable 302 such as, for example, a laptop computer, a desktop computer, a digital media player (e.g., an iPod™), a cellular telephone, a PDA, a handheld gaming device, a personal e-mail device (e.g., a Blackberry™), or any other suitable electronic device. Port 306 can include any port suitable to receive headset cable 302 (e.g., a communications port).

Figure 4:
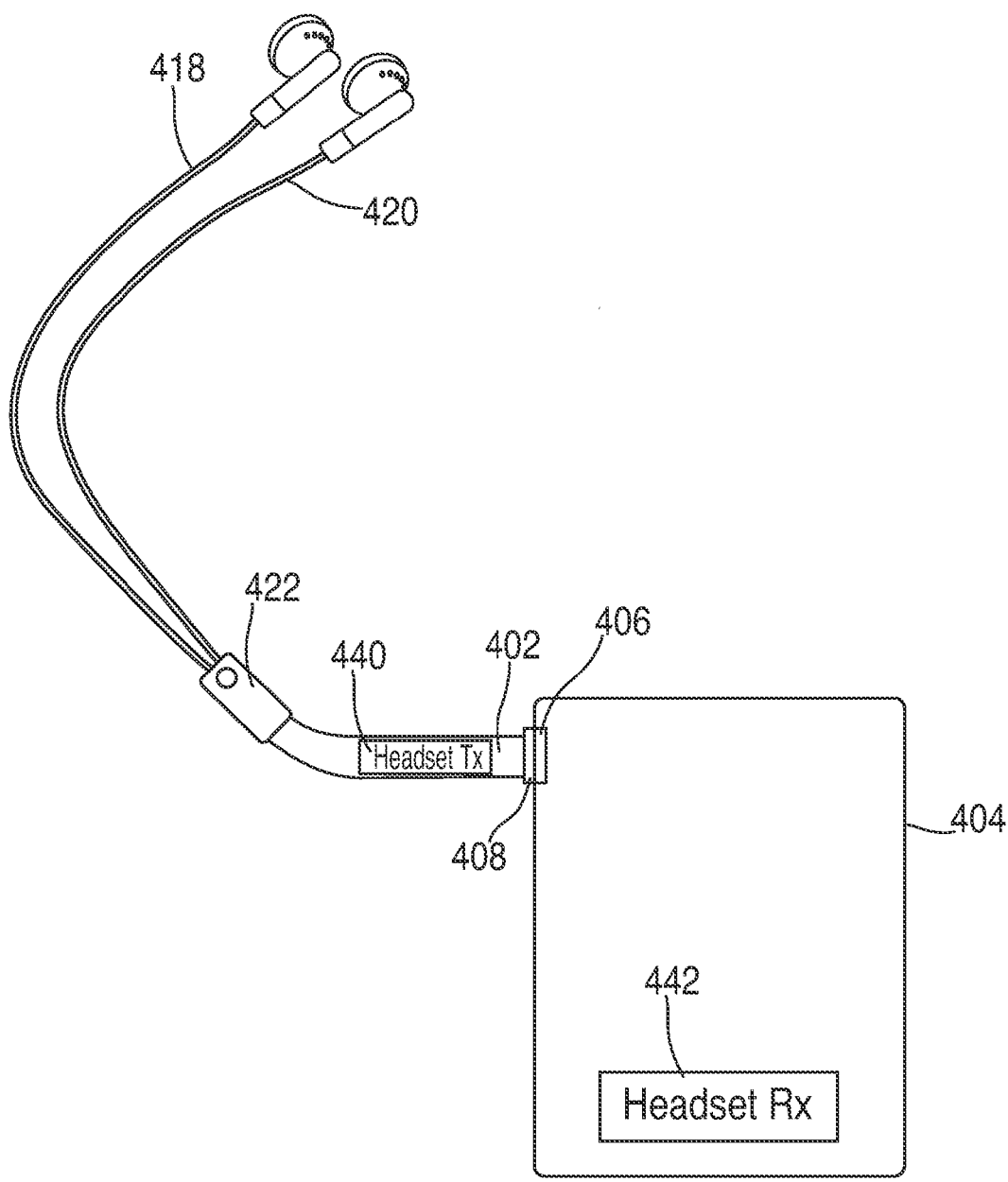

In some embodiments, headset cable 302 can include and couple electronic device 304 to, for example, headphones, speakers, a microphone, a user control interface (e.g., a remote controller that can include at least one user input), or any other suitable non-power providing friendly device or item. For example, FIG. 4 shows headset cable 402 that can couple to electronic device 404 and one or more of left headphone 418, right headphone 420, and user control interface 422. Although FIG. 4 illustrates headset cable 402 with left headphone 418, right headphone 420, and user control interface 422, one skilled in the art can appreciate that headset cable 402 may include any suitable combination of speakers, headphones, microphones, user inputs, or any other suitable non-power providing devices without departing from the scope of the invention.

User control interface 422 can include, for example, one or more buttons, touch screens, click wheels, switches, microphones, or any other suitable user input. In some embodiments, user control interface 422 may function as a remote controller that can allow a user to manipulate the playback of digital media files stored in electronic device 404 by, for example, pausing, stopping, playing, skipping, adjusting the volume, or otherwise suitably manipulating the playback of the files. In some embodiments, user control interface 422 can allow a user to control electronic device 404 by, for example, navigating menus or adjusting settings (e.g., power, volume, screen brightness, or any other suitable setting) of electronic device 404. In some embodiments, user control interface 422 can function as a microphone that can receive the user's voice as an input.

In some embodiments, headset cable 402 can communicate four signals as inputs, outputs, or both to electronic device 404. For example, headset cable 402 can communicate signals such as ground (e.g., GND), left headphone output (e.g., LEFT), right headphone output (e.g., RIGHT), and INPUT. In some embodiments, LEFT and RIGHT can alternatively function as any other suitable input, output, or bi-directional data signal. INPUT can include, for example, signals derived from user inputs received through user control interface 422. In some embodiments, plug 408 of headset cable 402 can include four contacts for communicating each of these four signals to port 406 of electronic device 404.

Similar to power-providing cable 202 and electronic device 204 of FIG. 2, headset cable 402 and electronic device 404 can each include one or more integrated circuits to allow them to communicate with one another. For example, headset cable 402 can include a headset cable transmit chip ("Headset Tx") 440 and electronic device 404 can include a headset cable receive chip ("Headset Rx") 4442. Although Headset Tx 440 is illustrated as located in the middle of headset cable 402 in FIG. 4, one skilled in the art can appreciate that Headset Tx 440 may alternatively be located in plug 408, left headphone 418, right headphone 420, user control interface 422, or anywhere along the length of headset cable 402 without departing from the scope of the invention.

Also similar to Power Tx 230 and Power Rx 232 of FIG. 2, Headset Tx 440 and Headset Rx 442 can communicate in order to identify or authenticate one another. For example, Headset Tx 440 can communicate a series of sine waves or any other suitable signals to Headset Rx 442. If an appropriate series of sine waves are received by Headset Rx 442 (e.g., if the sine waves are of the appropriate frequency, amplitude, or both), Headset Rx 442 may then authenticate Headset Tx 440.

As described above, an electronic device can couple to various types of power-providing cables and non-power providing cables. These cables can be very different in nature. For example, the cables may provide different types of functionality for the electronic device (e.g., transferring data, providing power, outputting audio, accepting user inputs, or any combination of the above), communicate different types of signals to the electronic device (e.g., GND, PWR, D+, D−, LEFT, RIGHT, or INPUT), and can require different types of ports to couple to the electronic device. Thus, because different ports may be required for each different type of cable, an electronic device may need to include a plurality of different ports in order to allow it to couple to these different cables. These multiple ports can require a substantial amount of space, thus potentially preventing the electronic device from achieving a small and compact design.

Accordingly, in some embodiments, a port that can couple to a variety of different cables can be provided. This can allow for an electronic device that can couple to a wide range of cables while requiring a fewer number of ports. In some embodiments, the electronic device may only require one port. This, in turn, may reduce the required size of the electronic device, thus allowing a smaller and more compact electronic device to be designed.

Figure 5:
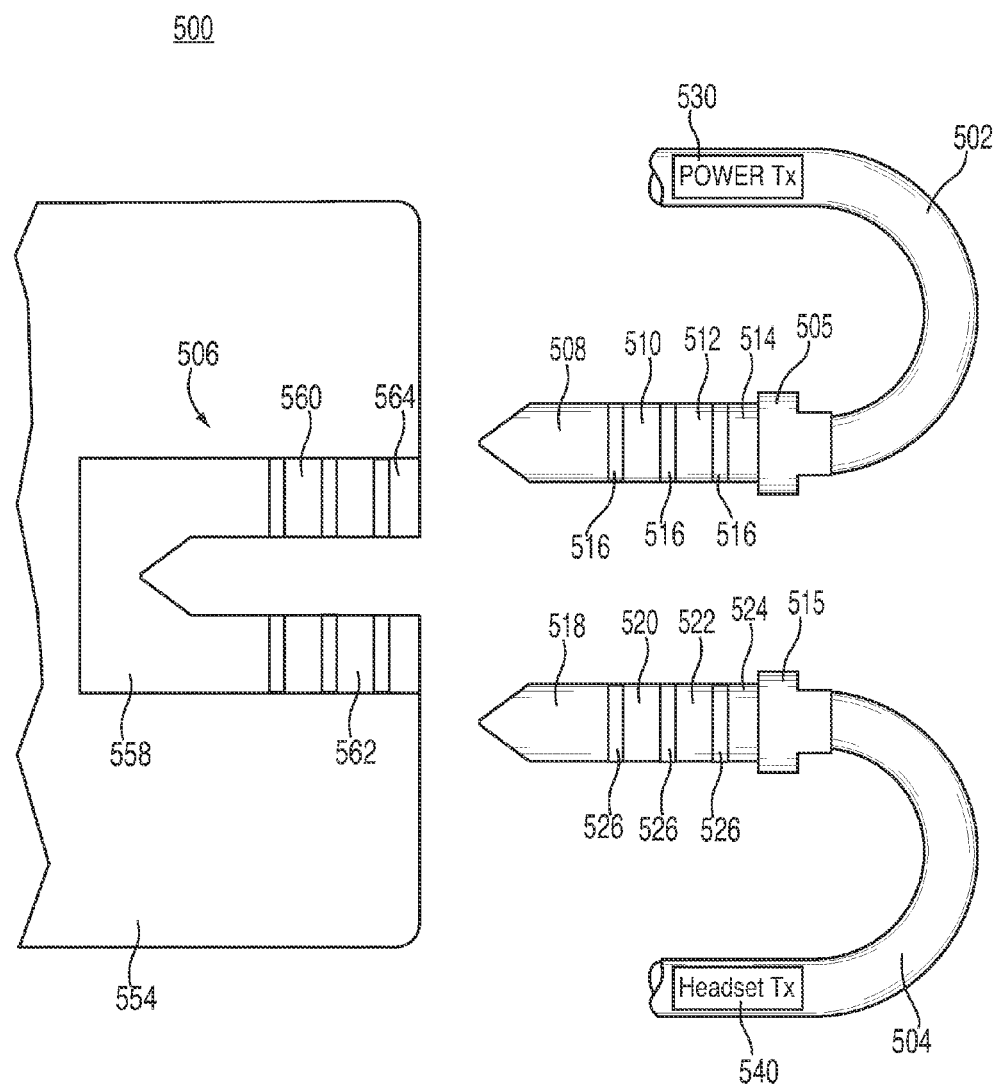
FIG. 5 shows an illustrative power-providing cable and non-power providing cable that can couple to the same communication port in accordance with some embodiments of the invention.

For example, FIG. 5 shows system 500 that can include power-providing cable 502 and headset cable 504. Similar to headset cable 402 of FIG. 4, one skilled in the art can appreciate that any suitable non-power providing cable may alternatively be used instead of headset cable 504 without departing from the scope of the invention. Additionally, similar to power-providing cable 202 of FIG. 2 and headset cable 402 of FIG. 4, power-providing cable 502 can include Power Tx 530 and headset cable 504 can include Headset Tx 540.

Power-providing cable 502 and headset cable 504 can be designed such that they can each couple to the same port 506 of an electronic device 554. Accordingly, electronic device 554 may only require a single port to allow it to couple to both power-providing cable 502 and headset cable 504. Although power-providing cable 502, headset cable 504, their associated plugs, and port 506 are illustrated in FIG. 5 as having a particular shape and design (e.g., they are illustrated as similar to a 3.5 millimeter plug and cable), the cables may alternatively include any suitable design, shape, or type of plug that can allow each cable to couple to the same port. For example, the cables can alternatively include a plug that is round in shape (e.g., PS/2), rectangular in shape (e.g., FireWire or USB Type-A), square in shape (e.g., USB Type-B, Ethernet plug, or telephone modem), trapezoidal in shape (e.g., D-Sub), or any other suitable shape or design.

As mentioned above, a power-providing cable and a headset cable may each include four contacts that can communicate four signals, although each cable may alternatively include any other suitable number of contacts or signals. For example, power-providing cable 502 can include plug 505 with a D− contact 508, D+ contact 510, GND contact 512, and PWR contact 514. Each of these contacts of power-providing cable 502 can be separated by an insulating ring 516. Similarly, headset cable 504 can include a plug 515 with a LEFT contact 518, RIGHT contact 520, GND contact 522, and INPUT contact 524. Each of these contacts of headset cable 504 can be separated by an insulating ring 526.

Port 506 may similarly contain four contacts (e.g., contacts 558, 560, 562, and 564) such that, when either plug 505 of power-providing cable 502 or plug 515 of headset cable 504 is inserted into port 506, the contacts of port 506 and the contacts of the inserted cable may electrically couple to one another. The electrical coupling of the contacts can then allow the appropriate signals to be communicated from the cable, through port 506, and to other portions of electronic device 554. For example, depending on whether power-providing cable 502 or headset cable 504 is coupled to port 506, contact 558 of port 506 can receive the D− signal or the LEFT signal, contact 560 of port 506 can receive the D+ signal or the RIGHT signal, contact 562 of port 506 can receive the GND signal, and contact 564 of port 506 can receive the PWR signal or the INPUT signal.

Figure 6:
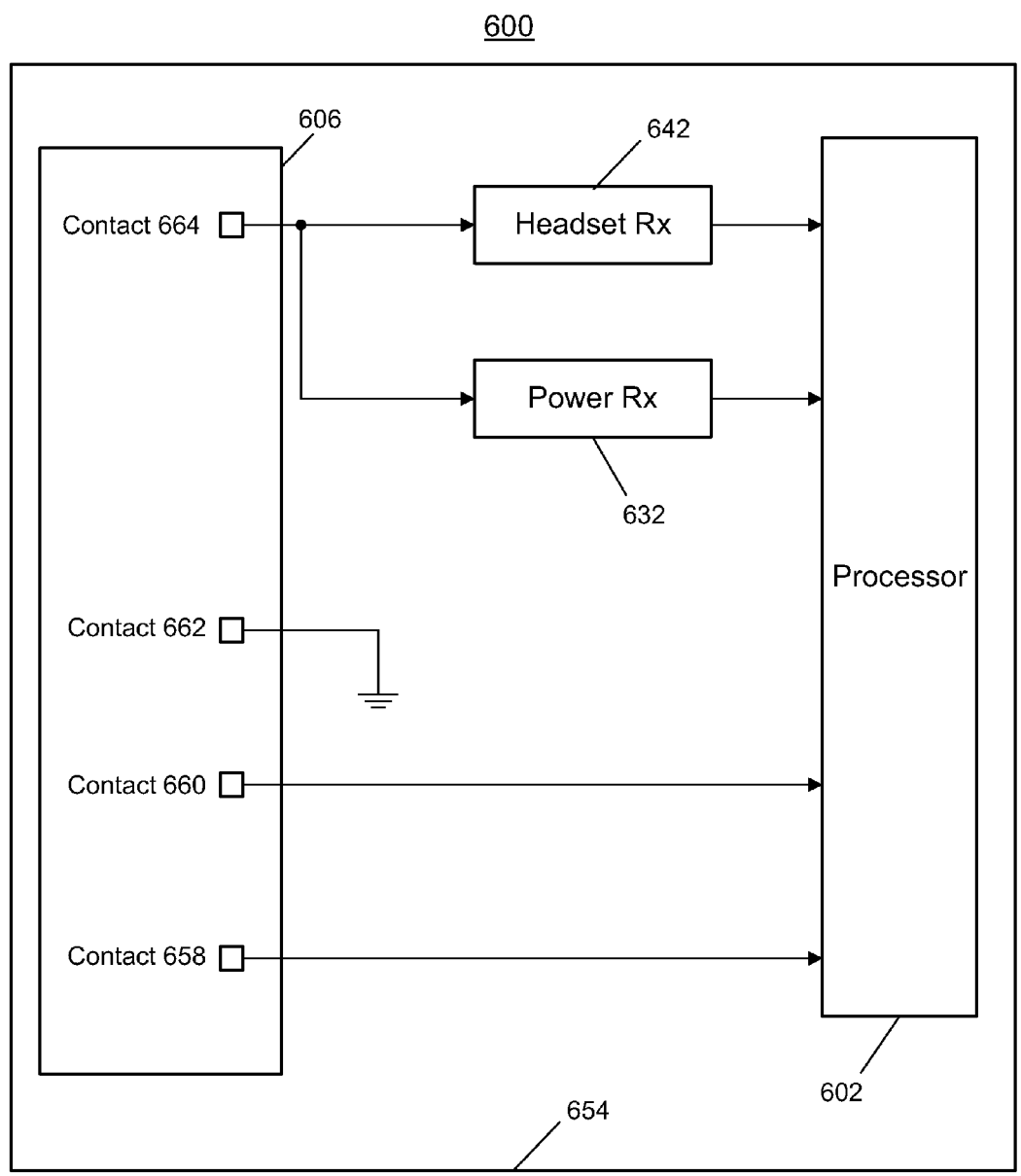
FIG. 6 shows a schematic view of a system for coupling multiple cable-types to the same communication port in accordance with some embodiments of the invention.

FIG. 6 shows a schematic view of system 600 of an electronic device 654 including a port 606 that can couple multiple power-providing cables and headset cables to the same port. Port 606 can include contact 658, contact 660, contact 662, and contact 664 that may, for example, correspond to contact 558, contact 560, contact 562, and contact 564 of port 506 of FIG. 5. Signals communicated through contact 658 (e.g., D− or LEFT) and contact 660 (e.g., D+ or RIGHT) can be coupled to processor 602. For example, when a power-providing cable is coupled to system 600, processor 602 may manage the data that is communicated through the D− and D+ signals. As another example, when a headset is coupled to system 600, processor 602 may control the audio signals that are output through the LEFT and RIGHT signals. Contact 662 can be coupled to GND, and can provide a GND signal for a power-providing cable or a headset cable that is coupled to system 600.

When a power-providing cable is coupled to port 606, contact 664 can receive a PWR signal from the power-providing cable. Alternatively, when a headset cable is coupled to system 600, contact 664 can receive an INPUT signal from the headset cable. Before proceeding to processor 602, the signal received through contact 664 can split and go through Power Rx 632 and Headset Rx 642. These chips, Power Rx 632 and Headset Rx 642, can correspond, respectively, to chips such as Power Rx 232 of FIG. 2 and Headset Rx 442 of FIG. 4. Accordingly, when a power-providing cable is coupled to system 600, the Power Tx chip of this cable can communicate with Power Rx 632 through the PWR signal to authenticate the power-providing cable. Similarly, when a headset cable is coupled to system 600, the Headset Tx chip of this cable can communicate with Headset Rx 642 through the INPUT signal to authenticate the headset cable.

In some embodiments, rather than having both Headset Rx 642 and Power Rx 632 coupled to contact 664, one of these chips may be disconnected when a cable has been coupled to system 600. Allowing both the Headset Rx 642 and Power Rx 632 to remain coupled to contact 664 may prevent a successful authentication of a cable or allow an unnecessary PWR signal to potentially damage the system.

For example, Power Rx 632 may include a particular amount of capacitance at its input. If Power Rx 632, and thus its input capacitance, is not disconnected from Headset Rx 642, this input capacitance may prevent successful authentication of a headset cable. This can occur since a Headset Tx chip in a headset cable may transmit a series of sine waves to Headset Rx 642 in an attempt to authenticate itself. The input capacitance or Power Rx 632 may, however, detrimentally cause the transmitted sine wave to be absorbed or altered. Thus, although the Headset Tx chip may have originally transmitted an appropriate sine wave, Headset Rx 642 may instead receive an altered, inappropriate sine wave and thus may not authenticate the Headset Tx chip.

As another example, Power Rx 632 may have leakage current that can prevent user inputs received from a headset cable (e.g., received from user control interface 422 of FIG. 4) from functioning properly. Accordingly, when a headset cable is coupled to system 600, Power Rx 632 can be disconnected from contact 664 to prevent this leakage current from potentially harming the operation of the headset cable.

As another example, when a power-providing cable is coupled to system 600, a PWR signal can be provided to both Power Rx 632 and Headset Rx 642. However, if Headset Rx 642 does not have any suitable internal protection to properly handle the PWR signal, Headset Rx 642 may be damaged by the PWR signal. For example, the PWR signal may cause damaging shorts or otherwise harm Headset Rx 642. Accordingly, in some embodiments, Headset Rx 642 can be disconnected from contact 664 when a power-providing cable is coupled to system 600.

Figure 7:
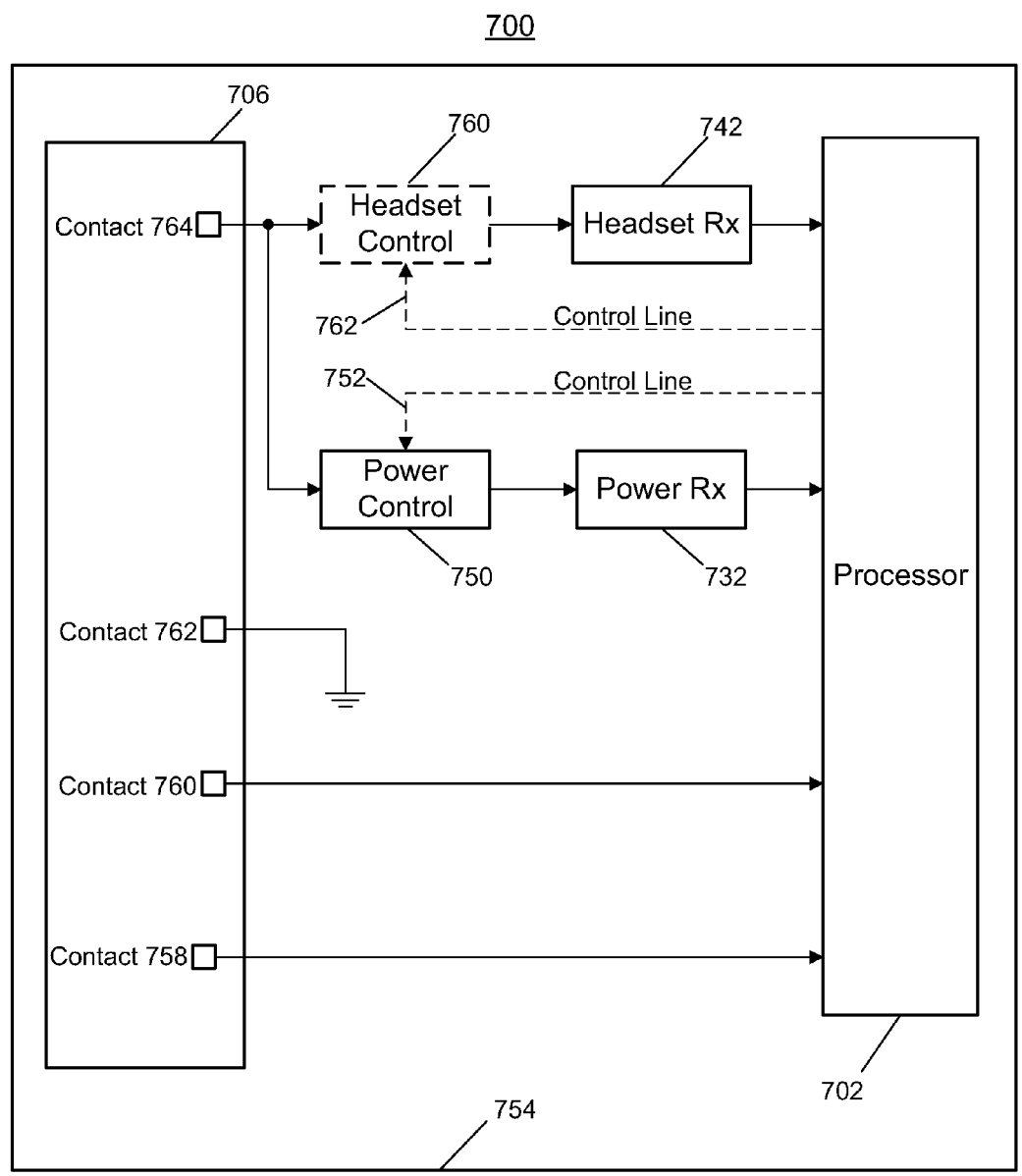
FIG. 7 shows a schematic view of a system including protection circuitry for coupling multiple cable-types to the same communication port in accordance with some embodiments of the invention.

FIG. 7 shows a schematic view of system 700 for electronic device 754 that can include port 706. System 700 can include protection circuitry such as, for example, Power Control 750 and Headset Control 760. Power Control 750 may disconnect Power Rx 732 from contact 764 when a headset cable is coupled to system 700. Similarly, Headset Control 760 may disconnect Headset Rx 742 from contact 764 when a power-providing cable is coupled to system 700. For example, when a headset cable is coupled to system 700, processor 702 can send instructions to Power Control 750 through Control Line 752 for directing Power Control 750 to disconnect Power Rx 732. Similarly, when a power-providing cable is coupled to system 700, processor 702 can send instructions to Headset Control 760 through Control Line 762 for directing Headset Control 760 to disconnect Headset Rx 742.

In some embodiments, if Headset Rx 742 has internal shielding to protect it from a PWR signal, Headset Control 760 may not be included in system 700. In particular, in some embodiments, system 700 can remove one or more of the components illustrated in FIG. 7, can include other components not illustrated in FIG. 7, can include several instances of the components shown in FIG. 7, or may rearrange various electrical connections or contacts without departing from the scope of the invention. For example, additional circuitry can be added or contact numbers may be rearranged without departing from the scope of the invention.

In some embodiments, system 700 can determine when a cable has been coupled to system 700. For example, processor 702 can analyze contact 758 or contact 760 to determine if a cable is coupled to system 700. When it has been determined that a cable is connected to system 700, system 700 can then determine what type of cable has been connected. Once the cable-type has been determined, system 700 can determine whether to disconnect Power Rx 732 or Headset RX 742.

In some embodiments, the cable-type can be determined by attempting to authenticate a particular transmit chip. For example, system 700 can "assume" (e.g., through software, an algorithm, or both) that a headset cable is coupled to the system and attempt to authenticate a Headset Tx chip. System 700 can thus direct Power Control 750 to disconnect Power Rx 732, and then attempt to authenticate a Headset Tx chip with Headset Rx 742. If a Headset Tx chip successfully authenticates, the system can remain with its current settings (e.g., can remain with Power Rx 732 disconnected). If, however, a Headset Tx chip does not successfully authenticate, system 700 can then "assume" (e.g., through software, an algorithm, or both) that a power-providing cable is coupled to the system. Accordingly, system 700 can reconnect Power Rx 732 and then disconnect Headset Rx 742. System 700 can then attempt to authenticate a Power Tx chip with Power Rx 732. In some embodiments, system 700 can continue to alternate between attempting to authenticate a Headset Tx chip and a Power Tx chip until a successful authentication is completed. Various ways in which a system can determine a cable-type by attempting to authenticate a Power Tx or Headset Tx chip is discussed in more detail with respect to FIG. 8 and in the descriptions to follow.

In some embodiments, the cable-type can be determined by identifying whether or not a PWR signal is present. If a PWR signal is present, the system can determine that a power-providing cable is coupled to the system. If a PWR signal is not present, the system can then determine that a headset cable is coupled to the system. Various ways in which a system can determine a cable-type by identifying whether a PWR signal is present is discussed in more detail with respect to FIG. 9 and in the descriptions to follow.

Figure 8:
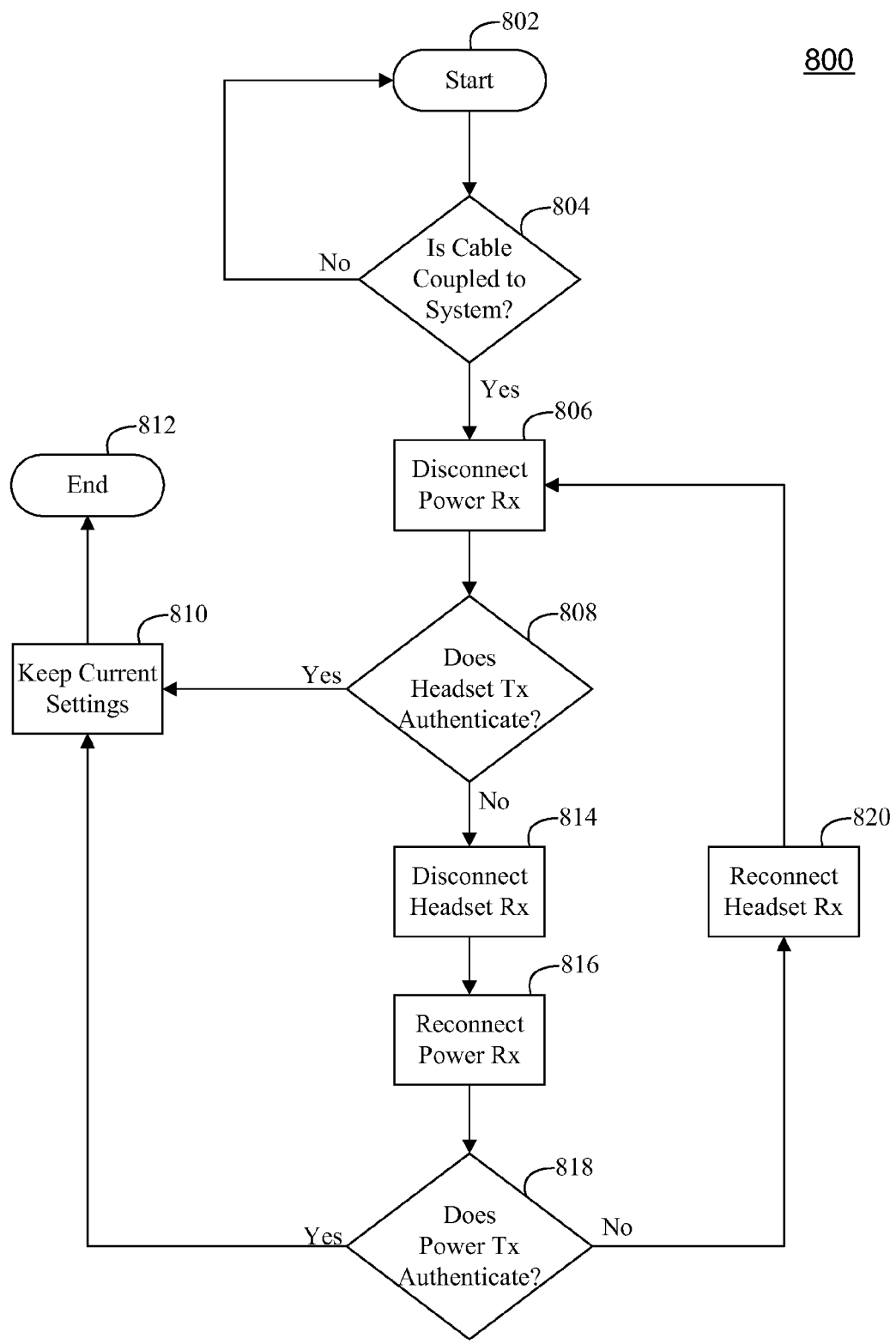
FIGS. 8 and 9 show illustrative processes for selectively handling multiple cable-types through the same communication port in accordance with some embodiments of the invention.

FIG. 8 shows process 800 that can identify what cable-type is coupled to a system by attempting to authenticate a Power Tx chip or a Headset Tx Chip.

Process 800 can begin at step 802. At step 804, process 800 can determine whether a cable is coupled to the system. For example, as described above, a processor can analyze contacts of a port (e.g., contact 758 or contact 760 of FIG. 7) to determine whether a cable is coupled to that port. If a cable is not coupled to the system, process 800 can continue to repeat steps 802 and 804 until a cable is coupled to the system.

When a cable is coupled to the system, process 800 can disconnect the Power Rx chip (e.g., Power Rx 732 of FIG. 7) at step 806. For example, a processor can supply a signal through a control line (e.g., Control Line 752 of FIG. 7) to a Power Rx Control System (e.g., Power Control 750 of FIG. 7). The signal supplied by the processor can then direct the Power Rx Control System to disconnect the Power Rx chip from the system. Accordingly, the Power Rx chip may then be disabled from preventing the successful authentication of a Headset Tx chip or from creating undesirable leakage current.

At step 808, process 800 can attempt to authenticate a Headset Tx chip (e.g., Headset Tx 540 of FIG. 5). For example, a Headset Rx chip of the system (e.g., Headset Rx 742 of FIG. 7) can sense if a Headset Tx chip is attempting to send an authenticating signal such as, for example, a series of sine waves. The Headset Rx chip can then analyze any signals that are received. If a received signal includes a series of appropriate sine waves (e.g., a series of sine waves of the appropriate frequency, amplitude, or any combination of the above) the Headset Rx chip can authenticate the Headset Tx chip. If the received signal does not include a series of appropriate sine waves, a Headset Tx chip may not be authenticated.

If a Headset Tx chip is authenticated, the system can keep its current settings at step 810. Generally, successfully authenticating a Headset Tx chip can indicate that a headset cable (or other appropriate non-power providing cable) has been coupled to the system. Accordingly, by keeping its current settings, process 800 can keep a Power Rx chip disconnected from the system, thus preventing undesirable input capacitance or leakage current from the Power Rx chip from harming the operation of the headset cable and Headset Rx chip. In some embodiments, successfully authenticating a Headset Tx chip can also indicate that the headset cable is appropriate for use with the system (e.g., the headset cable is not damaging to the system, or was provided by an approved vendor). Process 800 can then end at step 812.

When a Headset Tx chip is not successfully authenticated at step 808, process 800 can disconnect the Headset Rx chip (e.g., Headset Rx 742 of FIG. 7) at step 814 and then reconnect the Power Rx chip (e.g., Power Rx 732 of FIG. 7) at step 816. For example, a processor can send instructions through a control line (e.g., Control Line 762 of FIG. 7) to a Headset Rx Control System (e.g., Headset Control 760 of FIG. 7) for directing the Headset Rx Control System to disconnect the Headset Rx. Similarly, to reconnect the Power Rx chip, the processor can send instructions through a control line (e.g., Control Line 752 of FIG. 7) to a Power Rx Control System (e.g., Power Control 750 of FIG. 7) for directing it to reconnect the Power Rx chip.

At step 818, process 800 can attempt to authenticate a Power Tx chip (e.g., Power Tx 530 of FIG. 5). For example, a Power Rx chip of the system (e.g., Power Rx 732 of FIG. 7) can sense if a Power Tx chip is attempting to send an authenticating signal such as, for example, a series of pulses through a PWR signal. The Power Rx chip can then analyze any signals that are received. If a received signal includes a series of appropriate PWR signal pulses (e.g., a PWR signal of the appropriate frequency, amplitude, portraying the appropriate current spikes, or any combination of the above) the Power Rx chip can authenticate the Power Tx chip. If the received signal does not include a series of appropriate sine waves, a Power Tx chip may not be authenticated.

When a Power Tx chip is authenticated, process 800 can keep its current settings at step 810. Similar to the authentication of a Headset Tx chip at step 808, successfully authenticating a Power Tx chip can indicate that a power-providing cable has been coupled to the system. Accordingly, by keeping the current settings and leaving the Headset Rx chip disconnected from the system, the Headset Rx chip can be protected from accidental harm caused by power supplied through the power-providing cable. In some embodiments, the successful authentication can also indicate that an appropriate power-providing cable (e.g., a cable providing an appropriate amount of power or a properly regulated power supply, or a cable that may be provided by an approved vendor) has been coupled to the system. Process 800 can then end at step 812.

When a Power Tx chip is not successfully authenticated at step 818, the Headset Rx chip (e.g., Headset Rx 742 of FIG. 7) can be reconnected at step 820. For example, a Headset Rx Control System (e.g., Headset Control 760 of FIG. 7) can be instructed by a processor to reconnect the Headset Rx chip. In some embodiments, failing to authenticate either a Headset Tx chip or a Power Tx can indicate, for example, that an error has occurred in the system. For example, a cable may have been coupled to the system that has a faulty Headset Tx chip or a faulty Power Tx chip. As another example, an unidentifiable or unknown cable-type may have been coupled to the system. As another example, one end of a cable may be coupled to the system, but the other end of the cable may not be attached to anything. Accordingly, since the power-providing cable is not attached to a power source, the power-providing cable may be unable to provide an appropriate series of PWR signal pulses and the authentication may fail. Accordingly, when both a Headset Tx chip and a Power Tx chip fail to authenticate, process 800 can continue to loop through steps 806, 808, 814, 816, 818, and 820 and alternate between attempting to authenticate a Headset Tx chip and a Power Tx chip. Once a Headset Tx chip or Power Tx chip does successfully authenticate, the system can keep its current settings at step 810 and then end at step 812.

The processes discussed here are intended to be illustrative and not limiting. Persons skilled in the art can appreciate that steps of the processes discussed herein can be omitted, modified, combined, or rearranged, and any additional steps can be performed without departing from the scope of the invention. For example, in some embodiments, the order of steps, such as steps 814 and 816, can be switched, thus resulting in the reconnecting of the Power Rx chip before the disconnecting of the Headset Rx chip. As another example, in some embodiments, steps such as steps 814 and 820 can be omitted. For example, if the system contains a Headset Rx chip that has internal protection to prevent the chip from being harmed by a PWR signal, then it may not be necessary to disconnect and reconnect the Headset Rx chip at step 814 and 820.

As another example, in some embodiments, instead of attempting to authenticate a Headset Rx chip (e.g., steps 806 and 808) before attempting to authenticate a Power Rx chip (e.g., steps 814, 816, and 818), these steps can be reversed or subject to other conditions. For example, when an electronic device is turned on, there may be a higher likelihood that a user will desire to listen to music instead of trying to recharge the electronic device. Accordingly, since it may be more likely that a headset is coupled to the electronic device, the system can be configured to first check whether a Headset Rx chip can be authenticated when the electronic device is turned on. On the other hand, if the electronic device is turned off, there may be a higher likelihood that a user will desire to recharge the electronic device rather than listen to music. Accordingly, the system can be configured to first check whether a Power Rx chip will authenticate when the system is turned off. Alternatively, since a user typically cannot use an electronic device to listen to music when that device is turned off, in this scenario the device may be configured to only check whether a Power Rx chip will authenticate and to not attempt to authenticate a Headset Rx chip.

Figure 9:
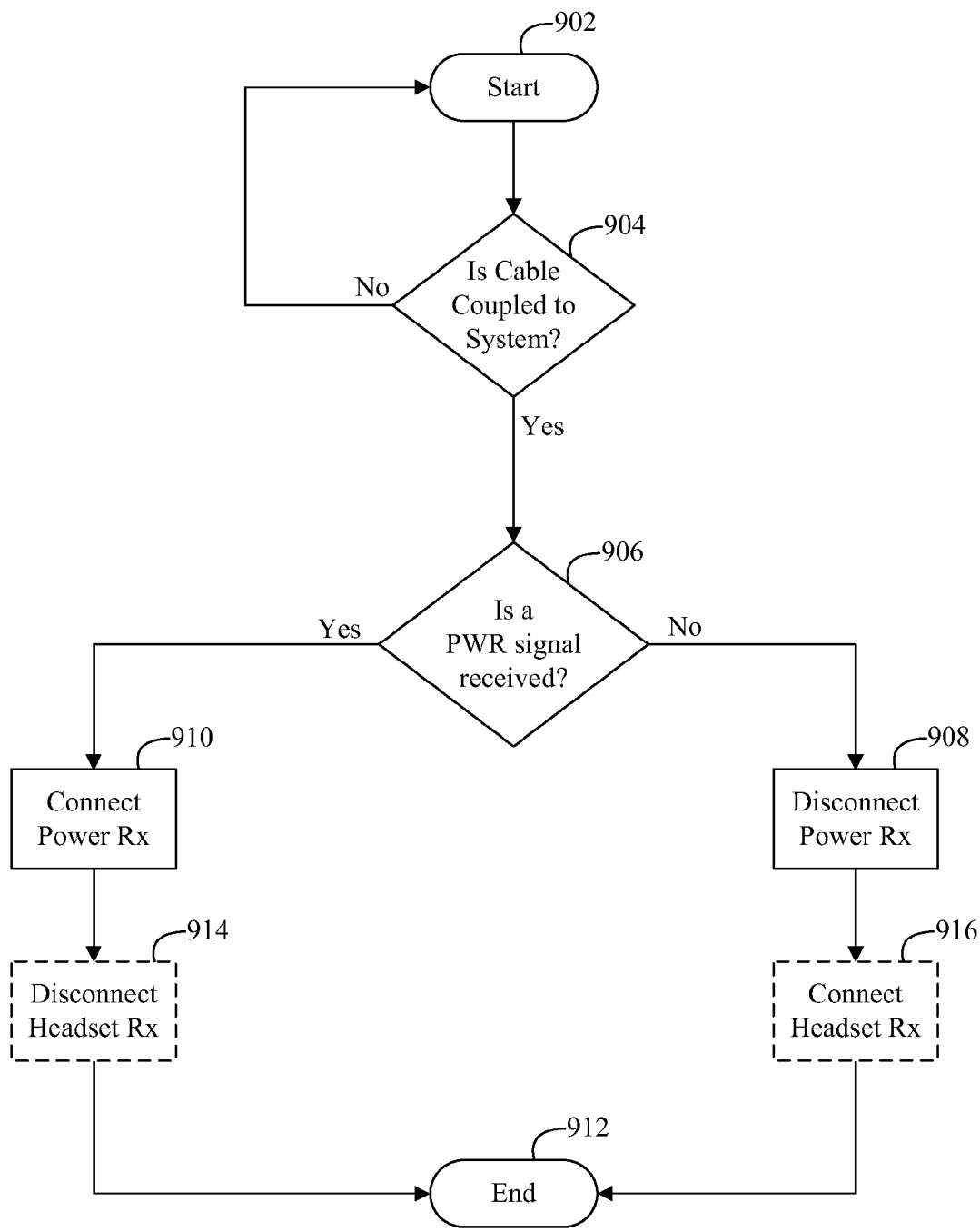

FIG. 9 shows process 900 that can identify what cable-type has been coupled to a system by determining whether a PWR signal is present. Process 900 may, for example, be used in addition to process 800 or in place of process 800. Process 900 can begin at step 902. At step 904, process 900 can determine whether a cable is coupled to the system. For example, similar to process 800 of FIG. 8, a processor can analyze contacts of a port (e.g., contact 758 or contact 760 of FIG. 7) to determine whether a cable is coupled to that port. If a cable is not coupled to the system, process 900 can continue to repeat steps 902 and 904 until a cable is coupled to the system.

When a cable is coupled to the system, process 900 can determine whether a PWR signal is being received at step 906. For example, the contacts of the port to which the cable is coupled can be analyzed to determine whether a PWR signal is present (e.g., contact 764 of FIG. 7 can be analyzed).

If a PWR signal is not present at step 906, this can indicate that a headset cable (or other suitable non-power providing cable) may be coupled to the system. Accordingly, the Power Rx chip (e.g., Power Rx 732 of FIG. 7) can be disconnected at step 908. Disconnecting the Power Rx chip can then prevent undesirable leakage current or input capacitance from affecting or harming the performance of the Headset Rx chip and headset cable. Process 900 can then end at step 912.

If, however, a PWR signal is present at step 906, this can indicate that a power-providing cable may be coupled to the system. Accordingly, the Power Rx chip can be connected at step 910. Process 900 can then end at step 912.

As mentioned above, in some embodiments a Headset Rx chip may be connected or disconnected in addition to the Power Rx chip. For example, if the Headset Rx chip does not have internal protection against a PWR signal, the PWR signal may cause electrical shorts or otherwise damage the Headset Rx chip. Accordingly, in some embodiments, process 900 may additionally disconnect the Headset Rx chip at optional step 914 when a PWR signal is present. Similarly, when a headset cable is coupled to the system and a PWR signal is not present, the Headset Rx chip can be reconnected at optional step 916.

The processes discussed here are intended to be illustrative and not limiting. Persons skilled in the art can appreciate that steps of the processes discussed herein can be omitted, modified, combined, rearranged, or combinations of these steps, and any additional steps can be performed without departing from the scope of the invention.

It will be apparent to those of ordinary skill in the art that methods involved in the present invention may be embodied in a computer program product that includes a machine readable and/or usable medium. For example, such a computer usable medium may consist of a read only memory device, such as a CD ROM disk or conventional ROM devices, or a random access memory, such as a hard drive device or a computer diskette, or flash memory device having a computer readable program code stored thereon.

The above described embodiments of the invention are presented for purposes of illustration and not of limitation, and the invention is limited only by the claims which follow.

What is claimed is:

1. An electronic device comprising:
   a port, the port comprising a first contact and a second contact;
   a processor coupled to the first contact, wherein the processor analyzes the first contact to determine when a cable having a circuit is connected at the port;
   a power control circuit coupled to the second contact, the power control circuit to receive a disconnect signal from the processor;
   a non-power providing cable receive circuit ("Headset Rx") coupled to the second contact, wherein the processor instructs the Headset Rx to attempt to authenticate the cable circuit, and the Headset Rx authenticates the cable circuit when the cable circuit is a non-power providing cable transmit circuit; and
   a power-providing cable receive circuit ("Power Rx") coupled between the power control circuit and the processor, wherein the processor instructs the Power Rx to attempt to authenticate the cable circuit, and the Power Rx authenticates the cable circuit when the cable circuit is a power providing cable transmit circuit;
   wherein when the power control circuit receives a disconnect signal from the processor, the power control circuit disconnects the Power Rx from the second contact, otherwise the Power Rx is coupled to the second contact through the power control circuit.

2. The electronic device of claim 1 further comprising:
   a headset control circuit coupled between the second contact and the Headset Rx, the headset control circuit to receive a second disconnect signal from the processor.

3. The electronic device of claim 2 wherein when the headset control circuit receives a disconnect signal from the processor, the headset control circuit disconnects the Headset Rx from the second contact, otherwise the Headset Rx is coupled to the second contact through the headset control circuit.

4. The electronic device of claim 1 wherein the Power Rx authenticates the cable circuit when the Power Rx receives a series of pulses from the cable circuit.

5. The electronic device of claim 1 wherein the Headset Rx authenticates the cable circuit when the Headset Rx receives a sine wave having an amplitude in a first range and a first frequency in a second range from the cable circuit.

6. The electronic device of claim 1 wherein when the power for the electronic device is off when the cable having a circuit is connected at the port, the Power Rx attempts to authenticate the cable circuit before the Headset Rx attempts to authenticate the cable circuit.

7. The electronic device of claim 1 wherein when the power for the electronic device is on when the cable having a circuit is connected at the port, the Headset Rx attempts to authenticate the cable circuit before the Power Rx attempts to authenticate the cable circuit.

8. An electronic device comprising:
   a port, the port comprising a first contact and a second contact;
   a processor coupled to the first contact, wherein the processor analyzes the first contact to determine when a cable having a circuit is connected at the port;
   a non-power providing cable receive circuit ("Headset Rx") coupled between the second contact and the processor, wherein the processor instructs the Headset Rx to attempt to authenticate the cable circuit, and the Headset Rx authenticates the cable circuit when the cable circuit is a non-power providing cable transmit circuit; and
   a power-providing cable receive circuit ("Power Rx") coupled between the power control circuit and the processor, wherein the processor instructs the Power Rx to attempt to authenticate the cable circuit, and the Power Rx authenticates the cable circuit when the cable circuit is a power providing cable transmit circuit;
   wherein when the Headset Rx authenticates the cable circuit, the processor disconnects the Power Rx from the second contact.

9. The electronic device of claim 8 further comprising:
   a power control circuit coupled to the second contact, the power control circuit to receive a disconnect signal from the processor.

10. The electronic device of claim 9 wherein when the power control circuit receives a disconnect signal from the processor, the power control circuit disconnects the Power Rx from the second contact, otherwise the Power Rx is coupled to the second contact through the power control circuit.

11. The electronic device of claim 8 further comprising:
    a headset control circuit coupled between the second contact and the Headset Rx, the headset control circuit to receive a second disconnect signal from the processor.

12. The electronic device of claim 11 wherein when the headset control circuit receives a disconnect signal from the processor, the headset control circuit disconnects the Headset Rx from the second contact, otherwise the Headset Rx is coupled to the second contact through the headset control circuit.

13. The electronic device of claim 8 wherein the Power Rx authenticates the cable circuit when the Power Rx receives a series of pulses from the cable circuit.

14. The electronic device of claim 8 wherein the Headset Rx authenticates the cable circuit when the Headset Rx receives a sine wave having an amplitude in a first range and a first frequency in a second range from the cable circuit.

15. The electronic device of claim 8 wherein when the power for the electronic device is off when the cable having a circuit is connected at the port, the Power Rx attempts to authenticate the cable circuit before the Headset Rx attempts to authenticate the cable circuit.

16. The electronic device of claim 8 wherein when the power for the electronic device is on when the cable having a circuit is connected at the port, the Headset Rx attempts to authenticate the cable circuit before the Power Rx attempts to authenticate the cable circuit.

\* \* \* \* \*